Sept. 6, 1949.  J. P. JOHNSON  2,481,018
RELIEF VALVE
Filed May 17, 1944

INVENTOR.
JAMES P. JOHNSON
BY
*C. Melbourne Green*
ATTY

Patented Sept. 6, 1949

2,481,018

UNITED STATES PATENT OFFICE 2,481,018

RELIEF VALVE

James P. Johnson, Shaker Heights, Ohio, assignor to The Aro Equipment Corporation, a corporation of Ohio Application May 17, 1944, Serial No. 535,971

3 Claims. (Cl. 251—145)

This invention relates to improvements in relief valves and more particularly to one designed for use on aircraft and disposed in the suction line between the vacuum pump and the vacuum actuated instruments for effecting substantially constant suction while the valve is in open position regardless of varying pump speeds to which the latter is subjected.

Suction relief valves at present available and in use are, in general, of the type disclosed in my prior Patent No. 2,217,056 dated October 8, 1940, and, while for reasons of necessity, are installed on aircraft they possess certain inherent characteristics which are undesirable in efficient operation, such as vibration of the disc valve member which resulted in inaccurate indications in the instruments readings materially aggravated when a more efficient filter was required. Again this vibration of the disc resulted in a noisy valve operation, both, possibly, caused by reason of the disc being disposed directly in the path of the air stream and lifted off its seat by the speed, pressure, and momentum of the volume of air flowing thereby.

With greater demands being made upon the flying conditions of aircraft, the pressure setting of instruments has become more important and in order to satisfy the former, the pressure must be constant within closer limits regardless of the speed of the engine which, in turn, operates the pump creating suction through this valve. The Air Corps therefore, prepares specifications covering the various accessories, of which the relief valve is one, setting up the requirements with respect to the size, shape, material, and operating functions with regard to efficiency and tests. All of these conditions must be met to obtain approval and acceptance of new devices developed and submitted.

It is therefore, one of the objects of the present invention to provide in a relief valve of the type referred to, an improved valve member slidably mounted in the housing in a manner to effectively prevent inherent vibrations of the valve member which affords a more quiet operation and materially reduces impulses in the suction line to the vacuum actuated instruments so that their readings are more accurate.

Another object of the present invention is to provide in a relief valve of the type referred to, an improved dampening means for the slidable valve member as a further precaution against undesirable vibrations.

Another object of the present invention is to provide in a relief valve of the type referred to, an improved means by which dampening of the valve member is proportionately decreased the greater the distance the valve member is separated from its seat.

Another object of the present invention is to provide in a relief valve of the type referred to, a normally closed valve member so mounted in the housing as to operate by a pressure differential on opposite sides of the valve member and adjustable means for varying the pressure differential whereby the valve member may be operated under different conditions as desired.

A final object of the present invention is to provide a relief valve which is simple in construction, inexpensive to manufacture and assemble, and efficient in operation.

With the objects above indicated and other objects hereafter explained in view, my invention consists in the construction and combinatio of elements hereinafter described and claimed.

Referring to the drawings.

Figure 1:
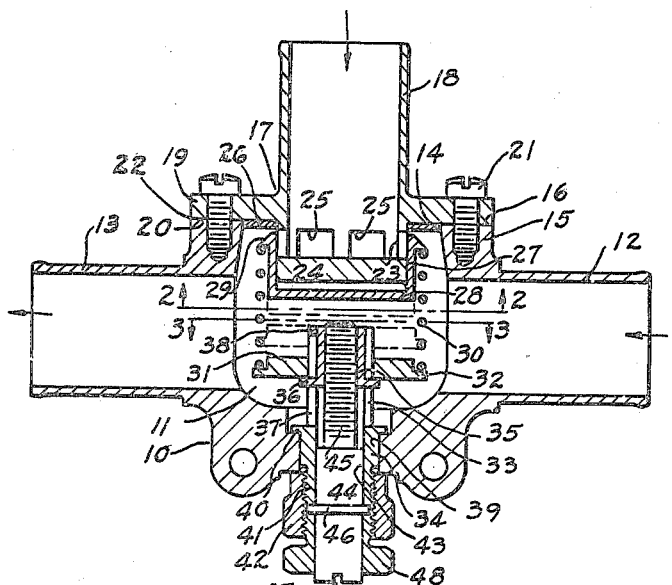
Fig. 1 is a vertical longitudinal sectional view taken substantially along line 1—1 in Fig. 4 and showing details of a relief valve embodying the present invention.
Figure 2:
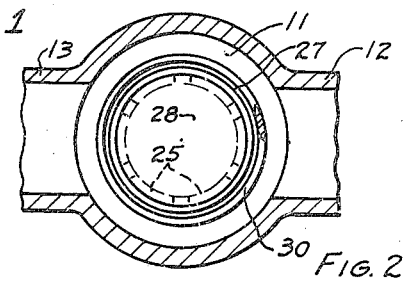
Fig. 2 is a fragmentary transverse sectional view taken substantially along line 2—2 in Fig. 1 and showing further details of the valve assembly.
Figure 4:
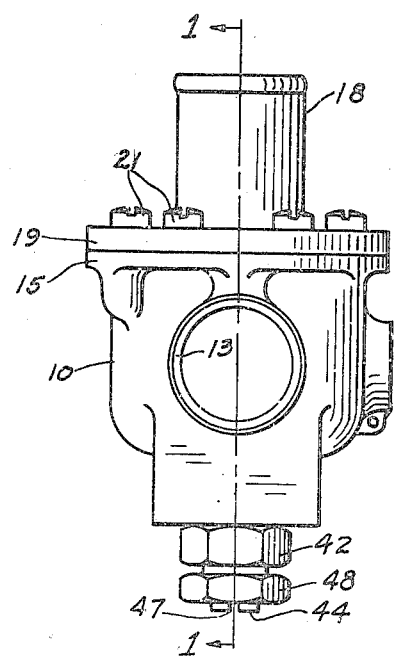
Fig. 4 is an end elevational view of the relief valve showing its outside formation.
Figure 3:
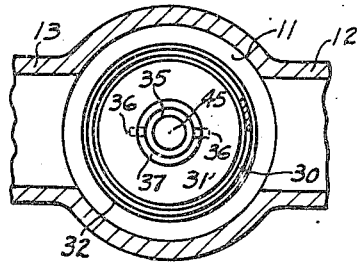
Fig. 3 is a fragmentary transverse sectional view taken substantially along line 3—3 in Fig. 1 and showing further details of the valve assembly.

In the drawings I have illustrated a relief valve assembly of preferred construction adapted to be disposed within the suction line between a vacuum pump and instrumentalities actuated thereby, whereby the suction required to properly actuate the instrumentalities is maintained substantially constant while the valve is open regardless of the operating speed of the vacuum pump. It is a well known fact that suction actuated instrumentalities employed on aircraft are delicate precision instruments and if subjected to abuse damage is caused thereto with resulting inaccuracies in their readings which materially affects efficient navigation. It is desirable however, that the instrumentalities be subjected to a uniform suction despite any variations in the rotation speed of the pump.

The relief valve disclosed in the drawings, therefore, embodies features which will produce these desired results and comprises a housing 10, preferably of aluminum or other light weight material and of relatively small dimension. The housing is provided with a chamber 11 of desired size at its central portion and tubular extensions 12 and 13 projecting outwardly on diametrically opposite sides, the extensions being in communication with the chamber 11 and adapted for connection with the suction actuated instruments and a vacuum pump or other suction creating means. The housing 10 is further provided with a circular shaped opening 14 extending transversely through its upper wall and communicating at its inner end with the chamber 11. An annular flange 15 is integrally joined to the housing 10 and projects outwardly in encircling relation about the outer portion of the opening 14, its outer face 16 being finished flat and smooth.

A cap or cover member 17 of aluminum or other light weight material, likewise is provided with a tubular extension 18 projecting outwardly for connection with a suitable filtering means communicating with the surrounding atmosphere for a purpose to be later described. The cover member 17 is further provided with an annular flange 19 projecting laterally outward and having its inner face 20 finished flat and smooth for removable mounting on the adjacent face 16 of the flange 15. A plurality of machine screws 21 are threadably mounted in axially aligned openings provided in the adjacent flanges 15 and 19 for detachably connecting the latter in assembled relation and a gasket 22 is disposed between the flat faces 16 and 20 on the flanges to provide a fluid tight joint. The cover member 17 is further provided with a second tubular extension 23, preferably of the same diameter as the extension 18, which projects inwardly into the chamber 11 a shorter distance on the diametrically opposite side in axial alignment and the inner end of the extension 23 terminates in a circular end wall 24 the outer peripheral face and end face of which are machined accurately and smooth to afford a suitable bearing surface for a purpose to be later described. Any suitable means may be employed for effecting communication between the extension 18 and the chamber 11 but a simple and efficient means is to form a plurality of slots 25 in the peripheral wall of the extension 23 adjacent the end wall 24 and which extend outwardly to adjacent the inner side of the cover flange 19. These slots are preferably of the same size and are disposed in a common horizontal plane, as shown in Fig. 1, equally spaced apart relatively. While six of these slots are shown any desired number may be adopted without affecting the efficiency. A flat annular disc 26 of Bakelite, or similar material, is disposed about the outer peripheral wall of the extension 23 and its inner face is secured to the under side of the cover flange 19, its outer face extending in a plane coincident with or slightly beyond the inner adjacent ends of the slots 25.

Likewise, any suitable valve mechanism for effecting the desired results may be adopted but from actual tests, the one illustrated has been found to be simple and efficient. A cylindrical shaped metal valve member 27 has an integral transversely extending end wall 28 formed at its lower end and is slidably mounted on the cover extension 23 to control the flow of air through the slots. The inside wall of the valve member 27 is accurately finished to provide a predetermined close clearance with respect to the extension 23 on which it is slidable and the adjacent end walls 24 and 28 are likewise spaced apart for a purpose to be later described. The valve member 27 is formed with a laterally extending marginal flange 29 at its outer end which flange is adapted for engagement with the adjacent face of the disc 26 to effect a seal which at the same time cuts off communication between the extension 18 and the chamber 11 through the slots 25. There is sufficient bearing surface provided for the slidable valve member 27 to prevent uncontrolled movement which would otherwise result in undesirable vibrations and as an additional precaution a dampening action is provided. This consists, in the present case, of providing a predetermined clearance between the bottom face of the cover end wall 24 and the inner face of the valve member 27 when the latter is in closed position as shown by full lines in Fig. 1. Sufficient clearance is also provided between the inner peripheral wall of the valve member 27 and the adjacent outer peripheral wall of the end wall 24 to permit air to pass therebetween into this space which when compressed by the closing movement of the valve member 27 functions as a dash pot or dampening means thus tending to counteract any vibrations of the valve member movement. As the valve member 27 is moved toward open position a greater space is formed but the dampening of the valve member is still effective although to a lesser extent. This relationship of effective dampening is very desirable in a valve of this type because the dampening action is greater when the valve member is closed as it should be. It is also possible to obtain quite a variation in the dampening effect on the valve member 27 by either changing the clearance between the latter and the extension 23 on which it is slidably mounted or by changing the spacing between the end wall 24 and the end wall 28 which affords an unlimited range of control to meet different operating conditions.

Any suitable means may be employed for effecting operation of the valve member 27 and adjustment for different suction requirements but a simple arrangement is illustrated in the drawings. A coil spring 30, of predetermined load characteristics, is axially disposed in a generally vertical position in the chamber 11, as shown in Fig. 1 and has its upper end in encircling relation about the valve member 27, the end being in abutting engagement with the under side of the flange 29 for normally urging the latter into sealing engagement with the disc 26 and simultaneously cutting off communication between the extension 18 and chamber 11 through the slots 25. An annular metal disc 31 is disposed in a generally horizontal plane at the lower portion of the chamber 11 in axially spaced relation with respect to the valve member 27 as shown in Fig. 1 and is formed at its lower end with a laterally projecting marginal flange 32 on which the lower end of the spring 30 abuts. The disc 31 has a central opening through which the upper tubular stem portion 33 of a supporting stud 34 projects in a manner to afford sliding movement of the disc 31. An adjusting nut 35 is freely positioned for relative sliding movement on the inside of the stem portion 33 and has a pair of outwardly projecting ears 36 on diametrically opposite sides adjacent the lower end which project through aligned slots 37 in the stem portion and engage the under side of the disc 31 to afford axial movement of the latter for desirably tensioning the spring. This arrangement affords free axial movement of the adjusting nut 35 but prevents relative rotation about its axis and one of the slots 37 is closed by a connection 38 at its upper portion to afford a positive stop for the nut. The supporting stud 34 is tightly fitted in an opening 39 provided in the wall of the housing 10 diametrically opposite to and in axial alignment with the opening 14. The supporting stud 34 is further formed with an outwardly projecting circumferential flange 40 adapted for engagement with the inside of the housing for definitely positioning the stud portion 33 and its extreme outer end 41, which projects beyond the housing, is exteriorly threaded to receive a nut 42 adapted to secure the stud against accidental removal. The stud 34 has a central opening 43 in which an adjusting rod 44 is rotatably mounted, the inner end 45 being of reduced diameter and exteriorly screwthreaded for cooperative engagement with a central opening interiorly screwthreaded provided in the adjusting nut 35 by which the latter may be axially moved. The rod 44 has an outwardly projecting circumferential flange 46 positioned for abutment with the outer screwthreaded end of the stud 34 and a screwdriver slot 47 is provided in the outer end of the rod to receive a suitable tool by which the rod is turned about its axis to suitably adjust the position of the nut 35. When the rod 44 has been so adjusted, a lock nut 48 is threaded into the outer end of the nut 42 and engages the outer side of the flange 46 thus securing the rod in the desired position. It should be obvious that the foregoing adjustment affords variation in the tension of the spring 30, which in turn predetermines the suction at which the valve member 27 will open and that the diametrical disposition of the ears 36 on the adjusting nut 35 effects easy and free axial movement of the disc 31 without fear of cocking the latter.

The construction of the relief valve described, is such that it may be connected in the suction line with either end 12 or 13 in communication with the vacuum pump or suction actuated instruments as the case may require, without any change whatsoever in its parts or efficient operation.

In the operation of the relief valve, for a clearer picture, the tubular extension 12 is connected by suitable conduit with the suction actuated instruments in a well-known manner while the tubular extension 13 is connected by suitable conduit with a well-known type of vacuum pump or other means for creating a vacuum for operation of the instruments. If the vacuum pump were operated at a constant speed there would be no necessity for a relief valve but the speed of the vacuum pump varies with the speed of the engine to which it is drivingly connected. By knowing the desired suction requirements for effective operation of the instruments without inherent injury, the spring 30 can be suitably tensioned to normally exert a closing force on the valve member 27 which in turn governs the effective size of the slots 25, thus affording admission of atmospheric air thru the tubular extension 18 into the chamber 11. The preloading of the spring 30 establishes the desired suction factor for operation of the instruments and it is this suction which is to be kept substantially constant regardless of any variation occurring in the speed of the vacuum pump. This is effected by a pressure differential which is present on opposite sides of the valve member 27 and the valve member is moved to open position by a difference in this pressure differential whereby sufficient atmospheric air is drawn into the chamber 11 to compensate for changes in pump speeds without substantially affecting the suction in the line to the instrumentality.

What is claimed is:

1. In a valve, a housing formed with a chamber and an opening leading therefrom, a tubular extension having a closed end projecting into said chamber and formed with one or more slots in its wall to afford communication between said chamber and the atmosphere, a valve member slidably mounted on said extension and adapted to control the effective size of said slot or slots, a pre-loaded spring operatively associated with said valve member for normally effecting a closed relation with respect to said slot, a tubular stud in said housing projecting into said chamber and outwardly from said housing, said outwardly projecting portion being formed with threads, a nut threaded onto said outwardly projecting portion to lock said stud in said housing, a spring retainer disc slidably mounted on said inwardly projecting portion of said stud and engaging an end of said spring disposed in axial spaced relation with respect to said valve, an adjusting nut axially movable in said stud and having diametrically opposite ears projecting through aligned slots through said stud, said ears engaging the side of said disc opposite said spring, a screw rotatable within said stud and in threaded engagement with said adjusting nut, said nut being formed with a flange one side of which is engageable with the end of said outwardly projecting portion of said stud, and a lock screw in threaded engagement with said first-named nut movable into clamping engagement with the opposite side of said flange.

2. In a valve, a housing formed with a chamber and an opening leading therefrom, means providing another opening affording communication between said chamber and the atmosphere and a seat between said another opening and chamber, a valve member in said housing reciprocable into and out of engagement with said seat to thus close and open communication between said another opening and chamber, a preloaded spring operatively associated with said valve member for normally effecting seating of said valve member on said seat, a tubular stud in said housing projecting into said chamber and outwardly from said housing, said outwardly projecting portion being formed with threads, a nut threaded onto said outwardly projecting portion to lock said stud in said housing, a spring retainer disc slidably mounted on said inwardly projecting portion of said stud and engaging an end of said spring disposed in axial spaced relation with respect to said valve, an adjusting nut axially movable and non-rotatable in said stud and engaging the side of said disc opposite said spring, a screw rotatable within said stud and in threaded engagement with said adjusting nut, said screw being formed with a flange one side of which is engageable with the end of said outwardly projecting portion of said stud, and a lock nut in threaded engagement with said first-named nut movable into clamping engagement with the opposite side of said flange.

3. In a valve, a housing formed with a chamber and an opening leading therefrom, means providing another opening affording comunication between said chamber and the atmosphere and a seat between said another opening and chamber, a valve member in said housing reciprocable into and out of engagement with said seat to thus close and open communication between said another opening and chamber, a preloaded spring operatively associated with said valve member for normally effecting seating of said valve member on said seat, a tubular stud in said housing projecting into said chamber and outwardly from said housing, said outwardly projecting portion being formed with threads, a nut threaded onto said outwardly projecting portion to lock said stud in said housing, a spring retainer disc slidably mounted on said inwardly projecting portion of said stud and engaging an end of said spring disposed in axial spaced relation with respect to said valve, an adjusting nut axially movable in said stud and having diametrically opposite ears projecting through aligned slots through said stud, said ears engaging the side of said disc opposite said spring, a screw rotatable within said stud and in threaded engagement with said adjusting nut, said screw being formed with a flange one side of which is engageable with the end of said outwardly projecting portion of said stud, and a lock nut in threaded engagement with said first-named nut movable into clamping engagement with the opposite side of said flange.

JAMES P. JOHNSON.

REFERENCES CITED

The following references are of record in the file of this patent:

UNITED STATES PATENTS

| Number | Name | Date |
|---|---|---|
| 583,668 | Bowen | June 1, 1897 |
| 1,153,401 | Milne | Sept. 14, 1915 |
| 1,267,465 | Schmidt | May 28, 1918 |
| 1,798,727 | DeSousa | Mar. 31, 1931 |
| 1,832,228 | Mattson | Nov. 17, 1931 |
| 1,845,290 | Kogstrom | Feb. 16, 1932 |
| 1,942,433 | Lindsay | Jan. 19, 1934 |
| 2,217,056 | Johnson | Oct. 8, 1940 |
| 2,299,079 | Davis | Oct. 20, 1942 |
| 2,308,583 | Berges | Jan. 19, 1943 |
| 2,367,989 | Alders | Jan. 23, 1945 |

FOREIGN PATENTS

| Number | Country | Date |
|---|---|---|
| 1,994 | Great Britain | 1875 |
| 769,699 | France | June 11, 1934 |